K. G. LUNDIN.
MOTOR VEHICLE CONSTRUCTION.
APPLICATION FILED AUG. 15, 1919.

1,339,269.

Patented May 4, 1920.
2 SHEETS—SHEET 1.

WITNESS:
Benj. Kahn

INVENTOR.
BY Karl G. Lundin
Victor J. Evans.
ATTORNEY.

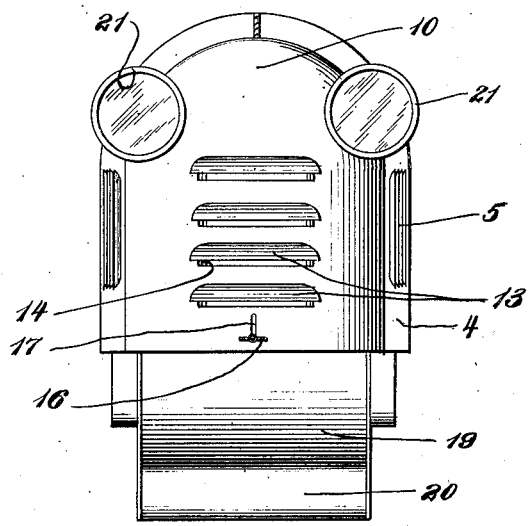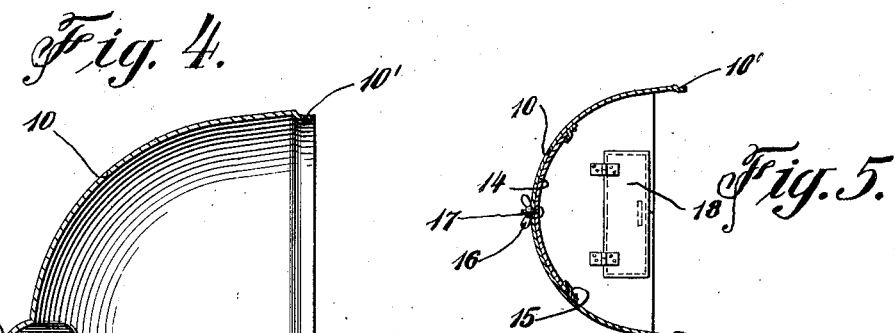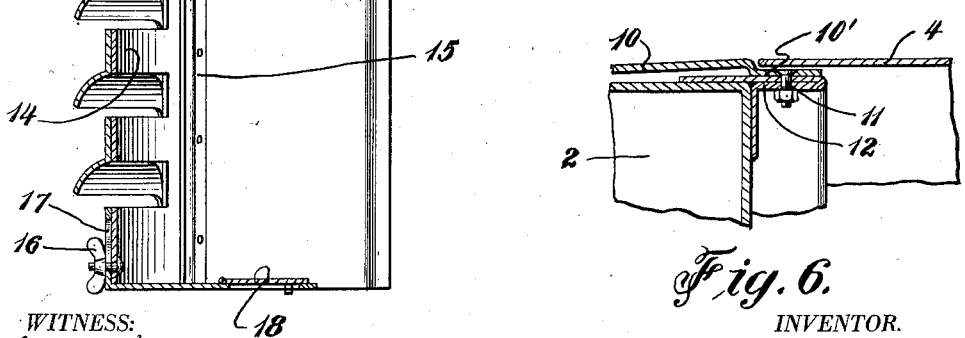

UNITED STATES PATENT OFFICE.

KARL G. LUNDIN, OF DETROIT, MICHIGAN, ASSIGNOR OF ONE-HALF TO JOSEPH C. MORRIS, OF DETROIT, MICHIGAN.

MOTOR-VEHICLE CONSTRUCTION.

1,339,269.     Specification of Letters Patent.    Patented May 4, 1920.

Application filed August 15, 1919. Serial No. 317,758.

*To all whom it may concern:*

Be it known that I, KARL G. LUNDIN, a subject under the King of Sweden, residing at Detroit, in the county of Wayne and State of Michigan, have invented new and useful Improvements in Motor-Vehicle Construction, of which the following is a specification.

This invention relates to improvements in the front construction of motor vehicles and the principal object of the invention is to add to the attractive appearance of the vehicle while at the same time protecting the radiator from the elements.

Another object of the invention is to provide means for controlling the supply of air passing through the radiator and through the side flaps of the hood.

The invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Fig. 3 is a front view.

Fig. 4 is an enlarged sectional view of the front.

Fig. 5 is a section on line 4—4 of Fig. 4.

Fig. 6 is a sectional view on line 6—6 of Fig. 2.

Figure 1:
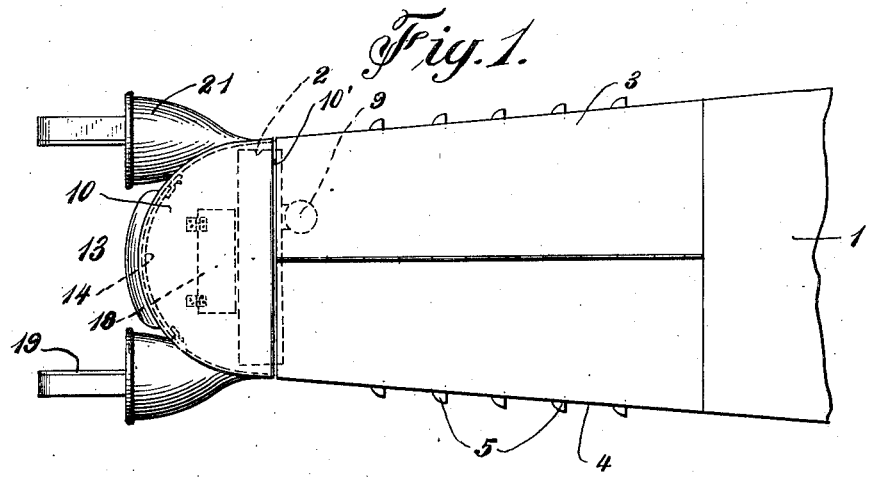
Figure 1 is a plan view of the front of a motor vehicle constructed in accordance with my invention.
Figure 2:
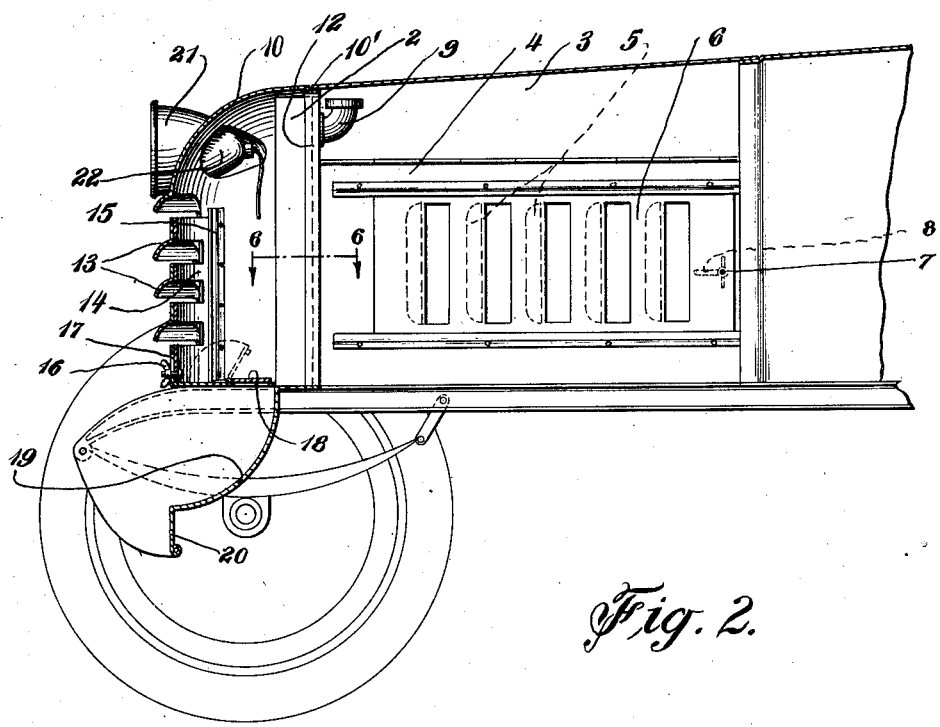
Fig. 2 is a sectional view thereof.

In these views 1 indicates the front part of the automobile, which lies immediately in front of the dash. 2 indicates the radiator and 3 indicates the hood which covers the engine and extends between the radiator and the part 1. The side flaps 4 of the hood 3 are provided with louvers 5, and these are adapted to be closed when desired by sliding shutters 6 which are adjusted in position by the thumb screw 7 engaging the slot 8 in said shutter. In this way by moving the shutter the openings in the flaps may be closed more or less as desired.

The filling spout 9 of the radiator is connected with the inner face of the upper water filling vessel and has its upper end in a plane below the hood so as to be covered by said hood when the hood is in place.

The front of the automobile is formed by a shell 10 which is of semi-cylindrical form in cross section and has its upper end curved upwardly toward the top of the radiator. This shell incloses the radiator and is secured in position by having its offset flanges 10′ secured by the bolts 11 to the angle brackets 12 which are soldered to the inner side corners of the radiator. The offset flanges form a seat for the front edges of the hood as shown in Fig. 6. The front face of the shell is provided with the louvers 13 and these are adapted to be opened and closed by the slide 14 which engages the guides 15 formed on the inner face of the shell. This slide is also adjusted in position by the thumb nut 16 engaging the slot 17. By this means the air passing through the radiator may be controlled. When desired a greater amount of air may be passed through the radiator by lifting the door 18 formed in the lower part of the shell and to which air is directed by the sweep shield 19 which is located below the shell 10 and in front of the front axle, and adapted to catch the air as the automobile travels along and direct it into said door. This shield is of curved shape as shown and extends downwardly in front of the axle and between the front springs. It may be provided with a straight lower edge 20 to receive the license plate. The headlights 21 are carried by the shell 10 and these headlights project from the sides of said shell as shown. Each of these headlights are provided with an inner removable shield 22.

It will thus be seen that an automobile constructed in accordance with my invention will have an attractive appearance due to the curved lines of the parts and the inclosing of the projecting parts, such as the filling spout of the radiator. It will also be seen that a large amount of air may be caused to pass through the radiator but when desired this may be so controlled that the whole supply of air may be cut off or cut down to any desired amount. By means of the door 18 access may be had to the interior of the shell.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In combination with an automobile and its radiator, a shell of semi-cylindrical form in cross section, a headlight on each side of said shell, means for detachably connecting said shell to the vehicle with the shell inclosing the radiator, louvers in the front face of said shell and means for opening and closing said louvers.

2. In combination with the front part of an automobile and its radiator, a shell of semi-cylindrical form in cross section with its upper end of curved formation, means for connecting said shell with the radiator, a door in the lower part of the shell, a curved shield located in front of the front axle for directing the air to said door, louvers in the front face of the shell and means for opening and closing the same.

3. In combination with the front part of an automobile and its radiator, a shell of semi-cylindrical shape in cross section and having a curved upper end, means for securing the same to the vehicle in front of the radiator, a headlight of substantially parabolical form intersecting each side of said shell, louvers on the front of said shell, means for opening and closing the same, a curved shield below the shell and in front of the axle and a door in the shell through which the air passes from the said curved shield.

In testimony whereof I affix my signature.

KARL G. LUNDIN.